May 12, 1942.  R. R. ROOT  2,282,828

NOZZLE FOR DUSTING MACHINES

Filed April 10, 1941

INVENTOR.
RALPH R. ROOT
BY
Kwis Hudson & Kent
ATTORNEYS

Patented May 12, 1942

2,282,828

UNITED STATES PATENT OFFICE 2,282,828

NOZZLE FOR DUSTING MACHINES

Ralph R. Root, Lakewood, Ohio, assignor to The Root Manufacturing Company, Cleveland, Ohio, a corporation of Ohio Application April 10, 1941, Serial No. 387,923

8 Claims. (Cl. 43—148)

This invention relates to improvements in nozzles for dusting machines, that is to say nozzles for machines employed in spreading insecticides and other powdered material upon growing plants.

An object of the invention is to provide means for causing a downwardly moving column of dust-laden air to be diverted laterally in all directions.

Another object is to provide a whirling distribution of the dust-laden air.

A further object is to provide means for driving the rotating distributor automatically.

Still another object is to so position the vanes which cause rotation that they will function additionally to agitate and break up further the dust-laden air emerging from the nozzle.

Other objects and features of novelty will appear as I proceed with the description of that embodiment of the invention which, for the purposes of the present application, I have illustrated in the accompanying drawing, in which Fig. 1 is a perspective view of a wheeled implement showing the type of apparatus with which the present invention may be employed.

Fig. 2 is a vertical sectional view of means for mixing dust with air and distributing it under pressure to tubular conductors.

Fig. 3 is a central longitudinal section of a nozzle embodying the invention, and Figs. 4 and 5 are transverse sectional views taken substantially on the lines 4—4 and 5—5 of Fig. 3.

In the drawing 10 represents a wheeled vehicle, preferably one with considerable ground clearance, so that it may be drawn through a field of growing plants of some height without injuring them. On it is supported a unit 11 comprising a hopper 12 in which the powder is carried, a compartment 13 in which small quantities of powder are agitated, cylindrical chamber 14 in which powder is mixed with air and a fan 15 which induces air flow through chamber 14 into the fan casing and out through funnel shaped connections 16 to tubular conductors 17. For a more detailed description of these parts reference may be had to my Patent 2,157,630, issued May 9, 1939.

The vehicle 10 supports a transverse rod 18 which carries clamps 19 that are adjustable along the length of the rod and which adjustably support the tubular connections 17 so as to hold them at selected heights. This height adjustment is useful not only in that it enables dust to be applied efficiently to plants of different heights, but also because it is advisable in some cases to have the nozzles extend down into the spaces between rows of plants for dusting the sides of the latter.

In accordance with the invention I provide a mounting for a rotatable shaft at the lower end of each conductor 17. In the present instance this is accomplished by providing a metal sleeve 20 to which is soldered a double walled partition 21 that is divided and curved at the middle to receive a small cylindrical housing 22 enclosing a thrust bearing 23 and a rotary bearing 24. The shaft 25 has a head 26 which rests upon the upper element of thrust bearing 23.

Sleeve 20 may have a flange 27 at its lower end. A piece of rubber hose 28 of a size to receive snugly the conductor 17 and the sleeve 20, which have the same outer diameter, is placed in position on the conductor and the sleeve 20 is then inserted into the hose until the flange 27 contacts the end of the latter, after which ring clamps 29 and 30 are tightened down.

Shaft 25 below housing 22 is curved along an arc of a circle, preferably an arc of about 45° in extent, this curved portion being indicated at 31 in the drawing. It is gripped by two sheet metal bracket members 32 which have complementary grooves to receive the curved shaft. Preferably these bracket members are arranged at right angles to the plane through the curved portion of the shaft, and therefore follow the same curvature as the shaft itself. At their outer ends these members have lips 33 and 33' which constitute vanes, each one extending somewhat less than half-way across the bracket. An elbow forming a rotatable continuation of sleeve 20 is carried upon this bracket. It is conveniently formed in two halves 34, having grooves 35 to take the edges of the bracket and flanges 36 which are spot welded together. In addition to serving as a means for mounting the elbow on the shaft, the bracket members also form a partition means which divides the elbow into two passages. One of the vanes 33 and 33' is associated with each of these passages and is offset with respect to the axis of the passages so that the air acting against the vanes will produce a rotative couple. As shown in the drawing, the vanes 33 and 33' are of substantially flat-plate form and are located outwardly of the discharge ends of the passages and extend in transversely inclined relation to the openings of such discharge ends.

The elbow 34 is preferably a 45° elbow, although this angle may be varied more or less.

Figure 1:
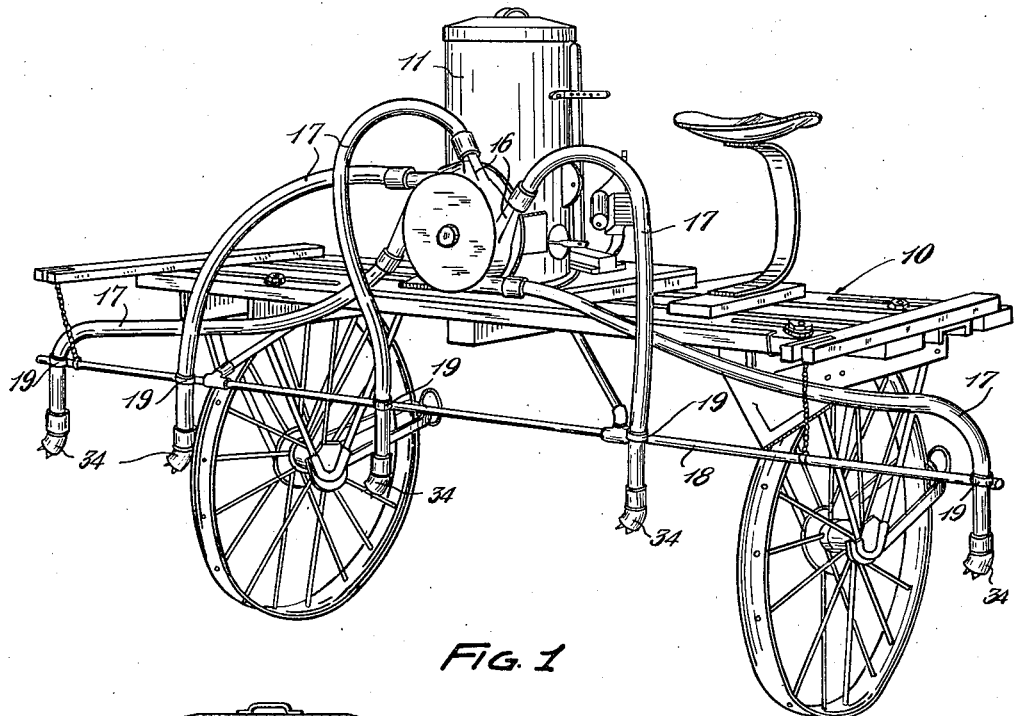
Figures 2, 3, 4, 5:
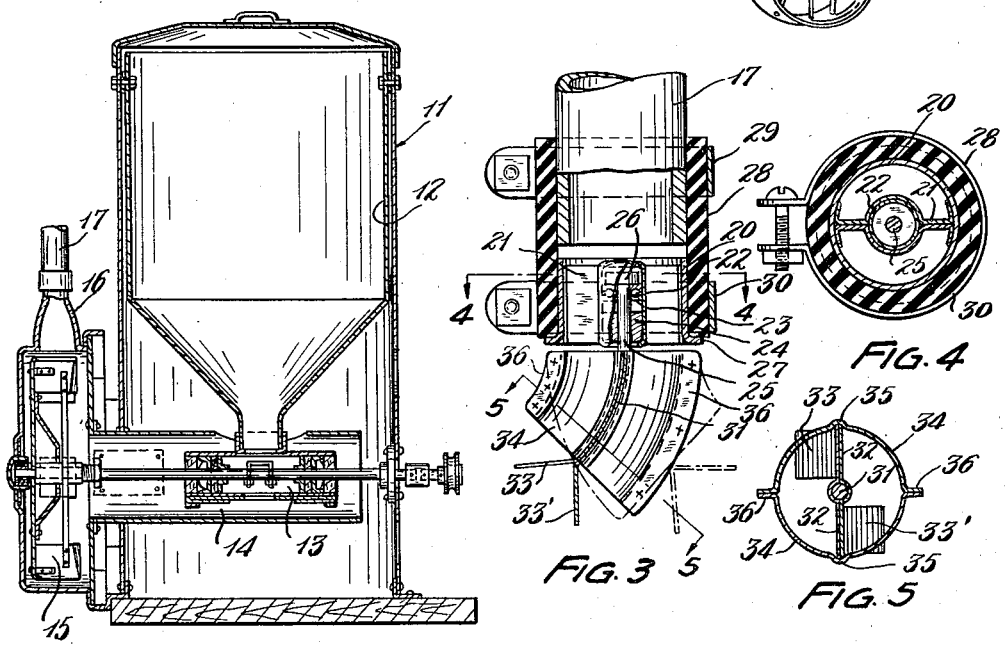

The dust-laden air travels at a rapid rate from the conductor 17 through the sleeve 20 and the elbow 34, being directed by the latter and by the bracket members 32 downwardly and outwardly and against the vanes 33. Its impact against the vanes tends to revolve them clockwise, as viewed in Fig. 5. The rotation however is necessarily around the upper straight shaft 25, and hence the bracket and elbow revolve, thereby swinging the mouth of the elbow laterally in all directions to distribute a cloud of dust over a relatively wide path as the vehicle advances. Two positions of the elbow and associated parts are indicated by the full and dotted lines in Fig. 3.

The whirling of the air in the lower part of the elbow also sets up centrifugal force tending to accentuate the outward travel of the delivered air, and the revolving vanes 33 and 33' tend to break up or agitate the dust, that is to say vane 33 tends to divert it upwardly and vane 33' tends to divert it downwardly. By using elbows of different angular extent the action of the device may be varied, that is the smaller the angle the more rapid will be the rotation, and the larger the angle the greater will be the lateral extent of the dust cloud. There is a practical limit to the size of this angle however for when it becomes too great rotation of the elbow will cease.

Variations from the described structure may be employed. Accordingly I desire it to be understood that the scope of the invention is to be regarded as defined exclusively by the appended claims rather than by the foregoing description or the accompanying illustration.

Having thus described my invention, I claim:

1. In apparatus of the character described, a conductor for dust-laden air, a rotatably mounted spreader at the end of said conductor, said spreader comprising an elbow having partition means dividing the same into a plurality of passages arranged to receive air from said conductor and adapted to deflect the air laterally, and vane means at the outer end of said passages for rotating the elbow in response to air flow therethrough.

2. In apparatus of the character described, a conductor for dust-laden air, a spreader at the end of said conductor mounted to turn about the axis of the conductor, said spreader comprising an elbow having partition means dividing the same into a plurality of passages arranged to receive air from said conductor and adapted to deflect the air laterally, and vane means located at the outer end of said passages and carried by said elbow for rotating the elbow in response to air flow therethrough.

3. In combination, a conductor for dust-laden air, a shaft axially mounted in the end of said conductor, said shaft having an extension deflected laterally, a bracket carried by said extension, an elbow carried by said bracket, and means for rotating said shaft.

4. In combination, a conductor for dust-laden air, a shaft axially mounted in the end of said conductor, said shaft having an extension deflected laterally, a bracket carried by said extension, an elbow carried by said bracket, and vane means also carried by said bracket for rotating the shaft in response to air flow.

5. In combination, a conductor for dust-laden air, a shaft axially mounted in the end of said conductor, said shaft having an extension deflected laterally, a bracket carried by said extension, a 45° elbow carried by said bracket, and vane means fixed in the outer end of said elbow for rotating said shaft and agitating the dust discharged by the elbow.

6. In combination, a conductor for dust-laden air, a spreader at the end of said conductor, and pivot means connecting the spreader with said conductor and mounting the spreader for rotation, said spreader comprising a curved tubular member having partition means therein extending substantially from said pivot means to the discharge end of such tubular member, and vane means arranged outwardly of the discharge end of said tubular member in transversely inclined relation to the openings of said discharge end so as to be acted upon by the moving air for whirling the spreader.

7. In combination, a conductor for dust-laden air, a rotatably mounted spreader at the end of said conductor comprising an elbow arranged to receive dust-laden air from said conductor and adapted to distribute the dust-laden air laterally during rotation of the elbow, said elbow having a partition therein dividing the same into two passages, and means for rotating said elbow in response to the flow of air therethrough comprising a pair of vanes connected to the partition on opposite sides of the axis of the elbow and arranged to project outwardly from the elbow in transversely inclined relation to the discharge ends of said passages so that the air being discharged by the elbow impinges against said vanes.

8. In apparatus of the character described, a conductor for dust-laden air, a spreader at the end of said conductor mounted to turn about the axis of the conductor, said spreader comprising an elbow having partition means therewith dividing same into plurality of passages adapted to receive dust-laden air from the conductor and to distribute the dust-laden air laterally during rotation of the elbow, and means for rotating said elbow comprising vane means of substantially flat-plate form connected with the elbow and located outwardly of the discharge end thereof in transversely inclined relation to the openings of said discharge end so that the air being discharged by the passages of the elbow impinges against said vane means.

RALPH R. ROOT.